March 13, 1951     H. J. FULLERTON     2,544,920
INSERT SEGMENT SAW
Filed Sept. 3, 1947
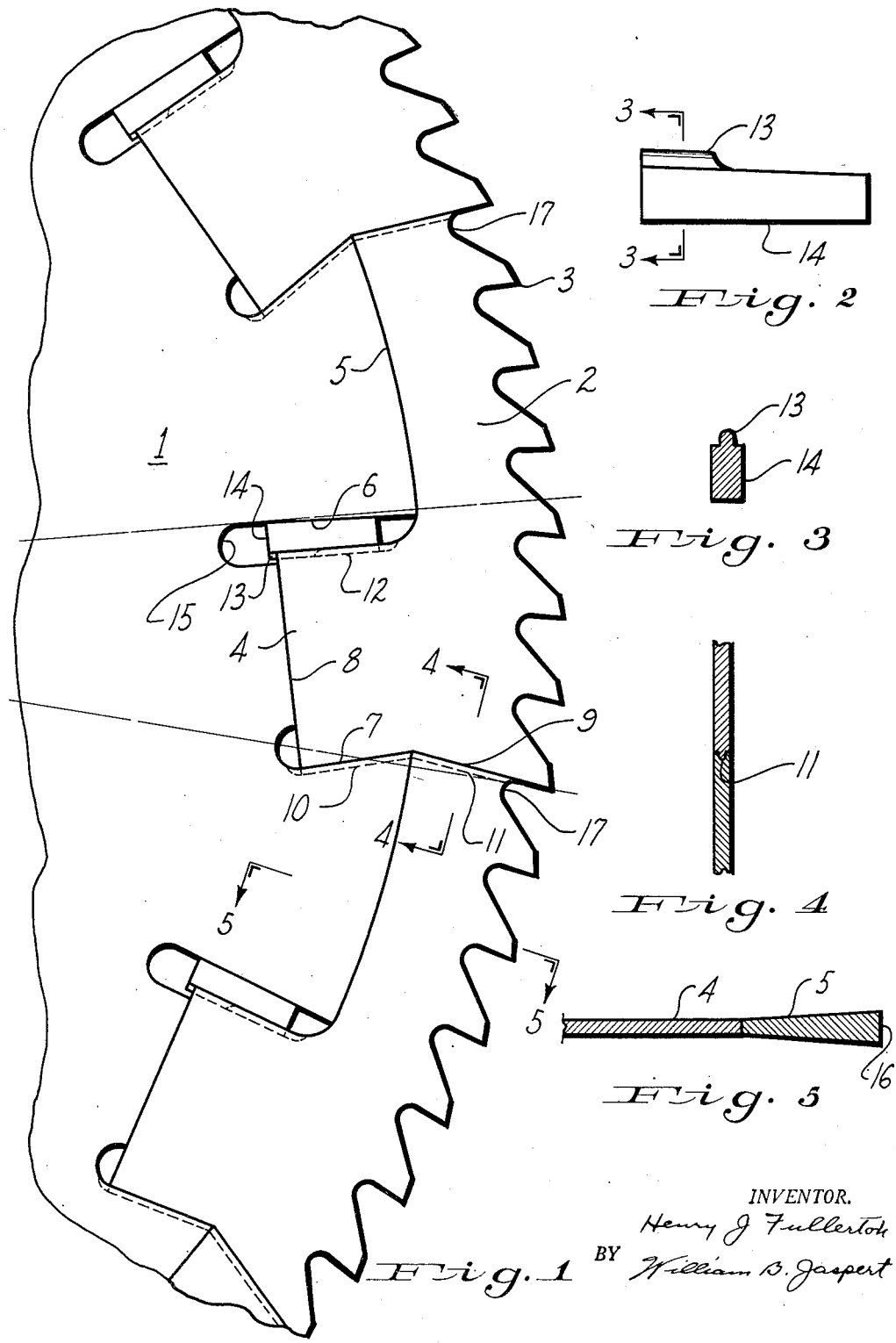
INVENTOR.
Henry J Fullerton
BY William B. Jaspert Patented Mar. 13, 1951

2,544,920

UNITED STATES PATENT OFFICE 2,544,920

INSERT SEGMENT SAW

Henry J. Fullerton, Pittsburgh, Pa., assignor to Pittsburgh Saw & Tool Company, Pittsburgh, Pa., a corporation of Pennsylvania Application September 3, 1947, Serial No. 771,972

3 Claims. (Cl. 29—95)

This invention relates to new and useful improvements in circle saws, more particularly of the type having insert segments with teeth that are assembled on the perimeter of the saw, and it is among the objects thereof to provide an insert segment tooth saw which is designed to securely lock the teeth segments to the body of the saw and to distribute the cutting load over the engaging faces of the segment with the saw body in a manner to effect a more secure interlocking of the engaging members.

Another object of the invention is the provision of a wedge insert for locking the segments to the saw body in which the wedging action is in the direction of the centrifugal forces acting upon the wedge, which tends to increase the gripping action of the wedge on the saw and segment parts.

These and other objects of the invention will become more apparent from a consideration of the accompanying drawings, constituting a part hereof, in which like reference characters designate like parts, and in which Fig. 1 is a side elevational view of a portion of a circle saw, broken away, with insert tooth segments embodying the principles of this invention;

Fig. 2 a side elevational view of a wedge for interlocking the segment with the body of the saw;

Fig. 3 a cross sectional view of the wedge taken along the line 3—3, Fig. 2;

Fig. 4 a cross sectional view through the engaging edges of the tooth segments, taken along the line 4—4, Fig. 1; and Fig. 5 a cross-sectional view radially of the tooth segment and a portion of the body of the saw, taken along the line 5—5, Fig. 1.

In the drawing the numeral 1 designates a disc of steel for mounting saw tooth segments 2, the diameters of which vary from twenty-four to eighty-four inches and which have peripheral speeds of from twenty to twenty-six thousand feet per minute, such saws being known as hot saws commonly employed in steel mills for cutting hot metal. Such saws were not heretofore provided with renewable tooth segments so that the saw disc may be used over and over. In accordance with the present invention the segments, which are substantially L-shaped as viewed from the base of the drawing, are provided with a number of cutting teeth 3, there being seven shown in the segments of the drawing, each segment having what may be termed a shank 4 with a peripheral extension 5. The saw disc 1 is of uniform cross section and thinner than the tooth segment, and the periphery of the saw is cut out to receive the shank portions 4 of the tooth segments.

The cut out portion may be designated as side edges 6 and 7 and an abutting edge 8. The edges 6 and 7 simulate a dove tail, although the edge 6 is at a different angle than the edge 7, the latter being more sharply inclined to constitute an abutting surface for the edge of the wedge shank 4 for receiving the cutting thrust acting on the teeth 3. The shank end 9 of the segment is cut at a sharp angle to the edge 7 for abutting against the complementary shaped end of the segment with which it abuts, the oppositely inclined edges 7 and 9 of the segment being provided with tongues for engaging grooves 10 in the cut out portion of the saw disc and grooves 11 in the end of the tooth segment to prevent displacement. The opposite edge of the shank 4 is provided with a groove 12 for receiving the tongue 13 of a wedge 14, Fig. 2, the tongue extending but a portion of the length of the wedge, as shown in Fig. 2, the length of the tongue 13 being less than the distance from the abutting edge 8 of the saw disc slot and a groove 15 provided in the saw disc. The wedge is therefore assembled after the segment is in place by merely dropping it into the groove slot 15 and driving it radially outward to the position shown in Fig. 1 of the drawing.

When subjected to high speed the wedge 14 is further forced radially outwardly to increase the wedging action, as distinguished from the prior art structures in which the wedge is shaped to wedge the associated parts by moving the wedge in a direction radially inward. Such wedges require locking by dowel pins or screws, or otherwise they are subjected to displacement by centrifugal force when the saw is cutting at the peripheral speeds employed in hot saw operations.

As shown in Fig. 5, the peripheral extension portion 5 of the tooth segment is wedge shaped to provide clearance for the cutting edge 16 of the teeth 3 and the shank portion 4 of the segment is of uniform cross section corresponding in thickness to the disc or body of the saw.

By virtue of the construction of the saw and tooth segments and the manner of mounting with the abutting faces inclined as shown and the wedge action tending to increase the locking effect of the segment with the saw body when subjected to the cutting speed of the saw, the tooth segments will be firmly held on the body of the saw against displacement when subjected to cutting action.

Also the design is simple to machine in the slotted portion of the saw body and the shaping of the tooth segments, and there are no screw or rivet connections, the only fastening member being the wedge 14 which is radially assembled by dropping it into the grooved slot 15 of the saw, as explained.

The distribution of forces on the saw body and tooth segment, when viewed as shown in Fig. 1, is such that when the edge of a tooth 3 contacts the work the forces act in a direction upward so that the narrow edge of the segment abuts the angular face 9 of the adjacent segment and tends to pivot on the apex against the groove face 10 of the saw body; that is to say, the forces will act in these directions since there cannot be any movement of the segment relative to the saw. By virtue of this design one edge of the tooth segment constitutes a tooth with the gullet 17 of the other end of the segment.

The design of the tooth segments and their connection with the saw disc is such as will provide great accuracy in machining and grinding of the parts, so that when assembled the completed saw will be a true circular saw equivalent to one in which the gullets are machined in the saw body to form the cutting teeth. Also by utilizing insert teeth segments they may be made of alloy steel to give long life and eliminate costly mill shut-downs.

Although one embodiment of the invention has been herein illustrated and described, it will be obvious to those skilled in the art that various modifications may be made in the details of construction without departing from the principles herein set forth.

I claim:

1. In a circle saw having angularly spaced slots in the outer periphery thereof, one side of which being inclined inwardly relative to the other side of the slot, tooth segments mounted in said slots, said segments comprising substantially L-shaped members, the short leg of which constitutes a shank for mounting in the slots of the circle saw disc, and the long leg of which engages the periphery of the saw disc, the long edge of the tooth segment having tongues and the short end of the segment being grooved for locking engagement when contiguous segments are assembled in the slots of the body of the saw, and the inclined side of the slot in the saw body being grooved to receive a tongue on the shank of the tooth segment, the other edge of the shank being grooved to receive the tongue of a wedge, the saw slots being cut deeper at one side of the slot for receiving a tongued portion of the wedge preliminary to inserting the wedge in interlocking engagement with the shank of the tooth segment.

2. In a circle saw having angularly spaced slots in the periphery thereof, tooth segments inserted in said slots having interlocking engagement with one edge of the slots, the other edge of the slot being wider than the tooth segment, a wedge for insertion in the slot for engaging the tooth segment, the wedge and segment having interacting tongues and grooves which on the wedge portion extends the short distance from the side edge of the wedge, said slots having a cut out portion wider than the widest face of the wedge for receiving the wedge preliminary to the forcing of the wedge radially outward to interlock the tooth segment with the saw body.

3. In a circle saw having angularly spaced slots in the periphery thereof, one of the faces of the slots being inclined inwardly and the other face being substantially radially with the body of the saw, the last-named edge being cut substantially deeper than the inclined edge of the slot, a tooth segment having a shank for engagement with the slot of the body of the saw in interlocking engagement with the inclined edge of the slot of the saw and the other face of the shank being grooved and spaced from the substantially radial wall of the slot, a wedge having a tongue projecting a portion of its length at the wide end thereof adapted to be inserted in the space between the shank and slot and slid into the groove portion of the shank of the tooth insert, said wedge having its wide portion at the bottom of the insert shank to effect wedging engagement with the shank when the wedge is moved radially outward.

HENRY J. FULLERTON.

REFERENCES CITED

The following references are of record in the file of this patent:

UNITED STATES PATENTS

| Number | Name | Date |
|---|---|---|
| 535,722 | Oldham | Mar. 12, 1895 |
| 1,048,181 | Krieger | Dec. 24, 1912 |
| 1,048,182 | Krieger | Dec. 24, 1912 |
| 1,278,630 | Freas | Sept. 10, 1918 |